US006103646A

United States Patent [19]

Chiou

[11] Patent Number: 6,103,646

[45] Date of Patent: Aug. 15, 2000

[54] PENETRATION-RESISTANT BALLISTIC ARTICLE

[75] Inventor: Minshon J Chiou, Chesterfield, Va.

[73] Assignee: E. I. du Pont de Nemours and Company, Wilmington, Del.

[21] Appl. No.: 08/963,094

[22] Filed: Nov. 3, 1997

Related U.S. Application Data

[60] Provisional application No. 60/055,148, Aug. 8, 1997, abandoned.

[51] Int. Cl.[7] .......... B32B 5/26

[52] U.S. Cl. .......... 442/244; 442/247; 442/301; 428/911

[58] Field of Search .......... 428/911; 442/244, 442/247, 301

[56] References Cited

U.S. PATENT DOCUMENTS

| | | | |
|---|---|---|---|
| 5,395,671 | 3/1995 | Coppage, Jr. et al. | 428/102 |
| 5,472,769 | 12/1995 | Goerz et al. | 428/138 |
| 5,565,264 | 10/1996 | Howland | 428/911 |
| 5,578,358 | 11/1996 | Foy et al. | 428/104 |

FOREIGN PATENT DOCUMENTS

| | | | |
|---|---|---|---|
| WO 93/00564 | 1/1993 | WIPO | F41H 5/04 |

*Primary Examiner*—Elizabeth M. Cole

[57] ABSTRACT

A combination of layered structures is disclosed for protection from both penetration and ballistic threats wherein the outer face is the penetration strike face and includes layers of fabrics tightly woven from aramid yarns of linear density less than 500 dtex; and the inner face includes ballistic layers.

10 Claims, No Drawings

PENETRATION-RESISTANT BALLISTIC ARTICLE

This is based on a provisional patent application No. 60/055,148, filed Aug. 8, 1997, now abandoned.

BACKGROUND OF THE INVENTION

1. Field of the Invention

It is well known that flexible garments made for protection from ballistic threats are not necessarily effective against stabbing by sharp pointed instruments. The converse is also true-penetration resistant articles are not necessarily effective against ballistic threats. This invention relates to articles which provide protection from both penetration (stabbing) threats and ballistic threats.

2. Discussion of the Prior Art

U.S. Pat. No. 5,578,358, issued Nov. 26, 1996, on the application of Foy et al. discloses a penetration-resistant structure made from woven aramid yarns having particularly low linear density.

International Publication No. WO 93/00564, published Jan. 7, 1993, discloses ballistic structures using layers of fabric woven from high tenacity para-aramid yarn.

U.S. Pat. No. 5,472,769, issued Dec. 5, 1995, as an example of attempts to provide both puncture resistance and ballistic resistance, describes a combination of knitted aramid yarn layers and deflection layers of materials such as metal wire.

SUMMARY OF THE INVENTION

This invention relates to a penetration resistant ballistic article comprising an outer face which comprises a plurality of tightly woven penetration resistant fabric layers and an inner face which comprises a plurality of ballistic layers.

DETAILED DESCRIPTION

The protective article of this invention was specifically developed to provide dual protection from penetration by sharp instruments as well as protection from ballistic threats. It is becoming ever more important that police and security personnel have simultaneous protection from both penetration threats and ballistic threats in the same protective garment. The inventor herein has investigated penetration resistant articles and ballistic articles and has made startling discoveries relating to the combination of those articles.

As a general rule, flexible penetration resistant articles are made using layers of fabric woven from yarn material with high tenacity and toughness; and the degree of penetration resistance is, among other things, a function of the linear density of the yarn and tightness of the weave. The lower the linear density of the yarn and the tighter the weave, the greater the penetration resistance. For example, it is known that excellent penetration resistant articles are made from aramid yarn having a linear density less than 500 dtex woven to a fabric tightness factor of at least 0.75.

"Fabric tightness factor" and "Cover factor" are names given to the density of the weave of a fabric. Cover factor is a calculated value relating to the geometry of the weave and indicating the percentage of the gross surface area of a fabric which is covered by yarns of the fabric. The equation used to calculate cover factor is as follows (from Weaving: Conversion of Yarns to Fabric, Lord and Mohamed, published by Merrow (1982), pages 141–143):

$d_w$ = width of warp yarn in the fabric $d_f$ = width of fill yarn in the fabric $P_w$ = pitch of warp yarns (ends per unit length)

$p_f$ = pitch of fill yarns $$C_w = \frac{d_w}{p_w} C_f = \frac{d_f}{p_f}$$

$$\text{Fabric Cover Factor} = C_{fab} = \frac{\text{total area obscured}}{\text{area enclosed}}$$

$$C_{fab} = \frac{(p_w - d_w)d_f + d_w p_f}{p_w p_f} = (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor. actual cover factor $$\text{Fabric tightness factor} = \frac{\text{actual cover factor}}{\text{maximum cover factor}}$$

For example, the maximum cover factor which is possible for a plain weave fabric is 0.75; and a plain weave fabric with an actual cover factor of 0.68 will, therefore, have a fabric tightness factor of 0.91. The preferred weave for practice of this invention is plain weave.

As a general rule, flexible ballistic articles are made using layers of fabric made from yarn material with high tenacity and toughness in enough layers to be effective against a specified threat. Fabrics for ballistic protection generally use yarns with relatively high linear densities and, when woven, have little regard for tightness of weave, except to avoid extremely tight weaves to avoid damage of yarn fibers resulting from the rigors of weaving.

To make a protective structure effective for threats from both, penetration by stabbing and ballistic threats, there have been combinations of material as previously pointed out and described in U.S. Pat. No. 5,472,769. The inventor herein has discovered an entirely different combination of materials which yields a remarkable improvement in protection.

The particular combination of this invention, utilizing penetration resistant material and ballistic material, exhibits a good ballistic protection and a penetration resistance which is much greater than would be expected from the sum of the penetration resistance of the individual elements of the combination. The individual elements of the combination of this invention include an outer face and an inner face.

The outer face includes a plurality of tightly woven fabric layers made from yarns of high strength fibers wherein the yarns generally have a linear density of less than 500 dtex and, preferably, the individual filaments in those yarns have a linear density of 0.2 to 2.5 dtex and preferably 0.7 to 1.7 dtex. The layers of the outer face can be made from aramids, polyamides, polyolefins, or other fibers usually used for penetration resistance. The preferred material for layers of the outer face is para-aramid yarns. The preferred linear density for yarns in the outer face is 100 to 500 dtex and those yarns are preferably woven to a fabric tightness factor of greater than 0.75, more preferably greater than 0.95. It is most preferred that the outer face fabric layers have a relationship between the yarn linear density (dtex) and the fabric tightness factor as follows:

$Y>X6.25\times10^{-4}+0.69$ wherein, Y=fabric tightness factor and X=yarn linear density, as disclosed in the aforementioned U.S. Pat. No. 5,578,358.

The inner face includes a plurality of layers of fibrous material which provide ballistic protection. The layers of the inner face can be woven or non-woven, and, if non-woven, can be unidirectional, uni-weave, or the like. The layers can be made from aramid, polyamide, polyolefin, or other polymers usually used for ballistic protection; and they can be resin impregnated or not. The preferred construction for layers of this inner face is woven para-aramid yarns with a linear density of 100 to 3000 dtex. If woven, plain weave is preferred to a fabric tightness factor of greater than about 0.90, although other weave types, such as basket weave, satin weave, or twill weave, can be used. The preferred para-aramid is poly(p-phenylene terephthalamide).

Yarns used in the fabrics of this invention, for outer faces and for inner faces, should exhibit a tenacity of greater than 20 grams per dtex and as much as 50 grams per dtex or more; an elongation to break of at least 2.2% and as much as 6% or more; and a modulus of at least 270 grams per dtex and as much as 2000 grams per dtex or more.

A combination of an outer face and an inner face is made by placing the two together, in face to face relation, with other layer materials therebetween or not, as desired. Other layer materials which may be placed between the outer and inner faces include, for example, cushioning materials, adhesive materials, water proofing materials, and the like.

It has been discovered that a combination of an outer face and an inner face, in accordance with the present invention, produces a penetration resistance which is much greater than the sum of the penetration resistances which would be exhibited by the outer and inner faces taken individually. Quite remarkably, it has also been discovered that a combination of an outer face with an inner face in a manner outside the present invention provides a penetration resistance which is much lower than the sum of the penetration resistances of the individual faces.

To be specific, and as will be shown in the Example, in a combination of an outer face with an inner face wherein the inner face is used as the strike face for a stabbing threat, the penetration resistance is much less than the sum of the penetration resistances for the individual faces taken alone. For that same combination, when the outer face is used as the strike face for a stabbing threat, the penetration resistance is much greater than the sum of the penetration resistances for the individual faces taken alone.

The gist of this invention resides in the discovery that a combination of different layer materials, when configured in one way, yields unexpectedly poor results and, when configured in another way, yields unexpectedly good results. The outer face of the combination of this invention is the face with the greatest penetration resistance and, for the purposes of this invention, must be the face which is to be struck by the penetration (stabbing) threat.

TEST METHODS

Linear Density. The linear density of a yarn is determined by weighing a known length of the yarn. "dtex" is defined as the weight, in grams, of 10,000 meters of the yarn.

In actual practice, the measured dtex of a yarn sample, test conditions, and sample identification are fed into a computer before the start of a test; the computer records the load-elongation curve of the yarn as it is broken and then calculates the properties.

Tensile Properties. Yarns tested for tensile properties are, first, conditioned and, then, twisted to a twist multiplier of 1.1. The twist multiplier (TM) of a yarn is defined as:

$TM=(twists/cm)/(dtex)^{-1/2}/30.3$

The yarns to be tested are conditioned at 25° C., 55% relative humidity for a minimum of 14 hours and the tensile tests are conducted at those conditions. Tenacity (breaking tenacity), elongation to break, and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50% strain/minute. The modulus is calculated from the slope of the stress-strain curve at 1% strain and is equal to the stress in grams at 1% strain (absolute) times 100, divided by the test yarn linear density.

Toughness. Using the stress-strain curve from the tensile testing, toughness is determined as the area (A) under the stress/strain curve up to the point of yarn break. It is usually determined employing a planimeter, to provide area in square centimeters. Dtex (D) is as described above under "Linear Density". Toughness (To) is calculated as $To=A\times(FSL/CFS)(CHS/CS)(1/D)(1/GL)$ where FSL=full-scale load in grams CFS=chart full scale in centimeters CHS=crosshead speed in cm/min CS=chart speed in cm/min GL=gauge length of test specimen in centimeters Digitized stress/strain data may, of course, be fed to a computer for calculating toughness directly. The result is To in dN/tex. Multiplication by 1.111 converts to g/denier. When units of length are the same throughout, the above equation computes To in units determined only by those chosen for force (FSL) and D.

Penetration Resistance. Penetration resistance is determined on a plurality of layers of the articles using an ice pick 18 centimeters (7 inches) long and 0.64 centimeter (0.25 inch) in shaft diameter having a Rockwell hardness of C-42. The tests are conducted in accordance with HPW test TP-0400.02 (Jul. 22, 1988) from H. P. White Lab., Inc. The test samples, placed on a 10% gelatin backing, are impacted with the ice pick, weighted to 7.35 kilograms (16.2 pounds) and dropped from various heights until penetration of the sample under test is accomplished. Results are reported as minimum penetrating kinetic energy (joules) by multiplying kilogram-meters, from the energy at the penetrating height, by 9.81.

Ballistics Performance. Ballistic tests of the multi-layer panels are conducted to determine the ballistic limit (V50) in accordance with MIL-STD-662e, except in the selection of projectiles, as follows: A panel to be tested is placed in a sample mount to hold the panel taut and perpendicular to the path of test projectiles. The projectiles are 9 mm full metal jacket hand-gun bullets weighing 124 grains, and are propelled from a test barrel capable of firing the projectiles at different velocities. The first firing for each panel is for a projectile velocity estimated to be the likely ballistics limit (V50). When the first firing yields a complete panel penetration, the next firing is for a projectile velocity of about 15.5 meters (50 feet) per second less in order to obtain a partial penetration of the panel. On the other hand, when the first firing yields no penetration or partial penetration, the next firing is for a velocity of about 15.2 meters (50 feet) per second more in order to obtain a complete penetration. After obtaining one partial and one complete projectile penetration, subsequent velocity increases or decreases of about 15.2 meters (50 feet) per second are used until enough firings are made to determine the ballistics limit (V50) for that panel.

The ballistics limit (V50) is calculated by finding the arithmetic mean of an equal number of at least three of the highest partial penetration impact velocities and the lowest complete penetration impact velocities, provided that there is a difference of not more than 38.1 meters (125 feet) per second between the highest and lowest individual impact velocities.

EXAMPLE 1

Tests for this example were conducted using layers of woven aramid yarn. The yarn was aramid yarn sold by E. I. du Pont de Nemours and Company under the trademark, Kevlar®. The aramid was poly(p-phenylene terephthalamide).

The outer face was made using ten (10) layers of fabric woven from 220 dtex aramid yarn with a tenacity of 24.3 grams per dtex, a modulus of 630 grams per dtex, and elongation at break of 3.5%, in a plain weave at 27.5×27.5 ends per centimeter and a fabric tightness factor of 0.995. The outer face had an areal density of 1.27 kg/m$^2$.

The inner face was made using eighteen (18) layers of fabric woven from 930 dtex aramid yarn with a tenacity of 24.0 grams per dtex, a modulus of 675 grams per dtex, and elongation at break of 3.4%, in a plain weave at 12.2×12.2 ends per centimeter and a fabric tightness factor of 0.925. The inner face had an areal density of 4.00 kg/m$^2$.

The outer and inner faces were tested individually and in combination for penetration resistance and, in two cases, ballistic limit. The combination was made by placing the outer face and the inner face together. Results of the tests are shown in the table.

| Faces | No. of Layers | Minimum Penetrating Kinetic Energy (joules) | Ballistic Limits V50 (m/sec) |
|---|---|---|---|
| Outer face only | 10 | 20.1 | — |
| Inner face only | 18 | <0.9 | 455 |
| Inner face over Outer face | 18/10 | 3.7 | — |
| Outer face over Inner face | 10/18 | 137.3 | 478 |

Minimum penetrating kinetic energy is the test result, in joules, for the Penetration Resistance Test described in the Test Methods. Note that the outer face exhibited a respectable minimum penetrating energy of 20 joules and the inner face exhibited almost no penetration resistance at all. When the inner and outer faces were combined for testing with the inner face as the strike face, the minimum penetrating kinetic energy was less than one-fifth that of the outer face tested alone.

When the inner and outer faces were combined for testing with the outer face as the strike face (in accordance with this invention), the minimum penetrating kinetic energy was surprisingly high and was even more than six times as high as the sum of the two faces tested alone. The article of this invention also exhibited good ballistic protection at a V50 of 478 m/sec.

EXAMPLE 2

Tests for this example were conducted using both aramid and polyolefin materials.

The outer face was the same ten-layer aramid structure which was used in Example 1.

The inner face was made using twenty four (24) layers of unidirectionally aligned ultra high molecular weight polyethylene fibers in a product sold by AlliedSignal Corp. Under the tradename Spectra Shield The layers were cross-plied and laminated between films of polyethylene. The inner face had an areal density of 3.85 kg/m$^2$.

The outer and inner faces were tested individually and in combination for penetration resistance and, in three cases, ballistic limit. The combination was made by placing the outer face and the inner face together. Results of the tests are shown in the table.

| Faces | No. of Layers | Minimum Penetrating Kinetic Energy (joules) | Ballistic Limits V50 (m/sec) |
|---|---|---|---|
| Outer face only | 10 | 20.1 | — |
| Inner face only | 24 | 3.7 | 437 |
| Inner face over Outer face | 24/10 | 36.6 | 474 |
| Outer face over Inner face | 10/24 | 141.0 | 478 |

As was the case in Example 1, note that the inner face, alone, exhibited almost no penetration resistance at all. Again, when the inner face and the outer face were combined for testing with the inner face as the strike face, the minimum penetrating kinetic energy was about one-fourth that exhibited by the same combination when the outer face was tested as the strike face. When the outer face was used in testing the combination, the penetrating kinetic energy was much higher than the sum of the two faces tested alone; and the combination exhibited equivalent ballistic results with either face as the strike face.

What is claimed is:

1. A penetration resistant ballistic article comprising an outer face which comprises a plurality of penetration resistant fabric layers woven to a fabric tightness factor of at least 0.75 and an inner face which comprises a plurality of ballistic layers wherein the outer face is the face of the article which is the strike face for penetration threats.

2. The article of claim 1 wherein the penetration resistant layers comprise fabric woven from aramid yarn having a linear density of less than 500 dtex and characterized by having the fabric woven to a fabric tightness factor of at least 0.75.

3. The article of claim 2 wherein the yarn of the penetration resistant layers have a linear density of 100 to 500 dtex and filaments with a linear density of 0.7 to 1.7 dtex.

4. The article of claim 1 wherein the ballistic layers are made from fibers exhibiting elongation to break of greater than 2.2%, a modulus of greater than 270 grams per dtex, and tenacity greater than 20 grams per dtex.

5. The article of claim 2 wherein the ballistic layers are made from fibers exhibiting elongation to break of greater than 2.2%, a modulus of greater than 270 grams per dtex, and tenacity greater than 20 grams per dtex.

6. The article of claim 4 wherein fibers of the ballistic layers are yarns having a linear density of 100 to 3000 dtex.

7. The article of claim 6 wherein the yarns of the ballistic layers are woven.

8. The article of claim 6 wherein the yarns of the ballistic layers are non-woven.

9. The article of claim 6 wherein the yarns of the ballistic layers are para-aramid.

10. The article of claim 2 wherein the aramid yarn is para-aramid yarn.

* * * * *